Patented Aug. 21, 1951

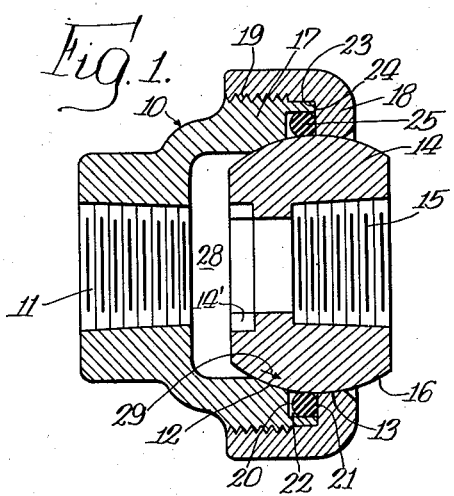
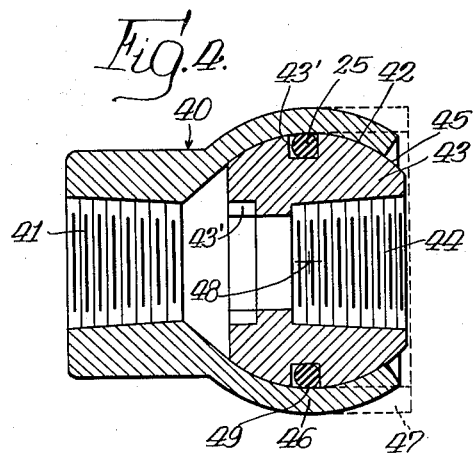
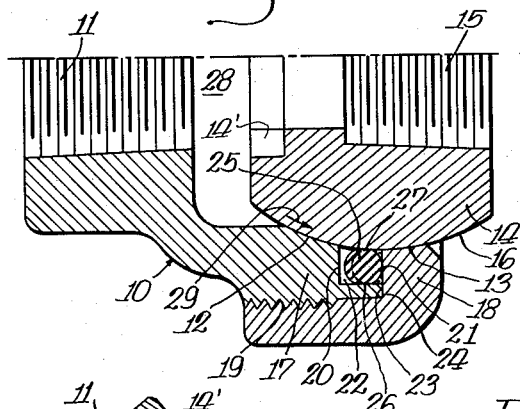
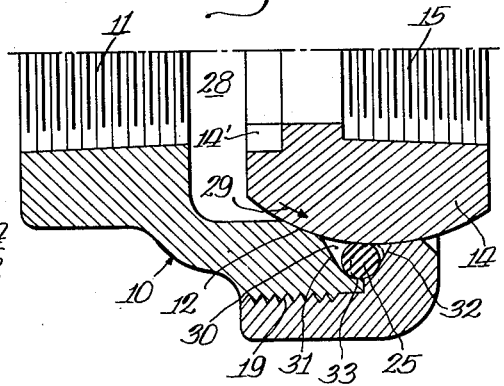
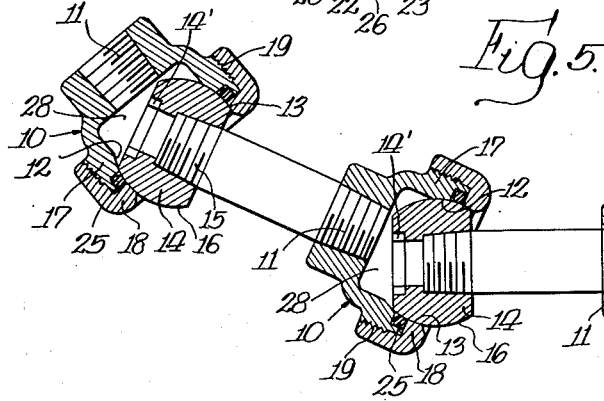

2,564,938

UNITED STATES PATENT OFFICE 2,564,938

FLEXIBLE PIPE JOINT

Charles F. Warren, Milwaukee, Wis.

Application May 21, 1945, Serial No. 595,016

9 Claims. (Cl. 285—95)

More particularly the invention relates to flexible pipe joints of the ball and socket type and has for its general object the provision of a new and improved ball and socket joint.

Another object is to provide a ball and socket pipe joint in which the parts may be moved freely, even when conducting fluid under high pressures, over a wide range of angles and which has a sealing means that is leak-proof regardless of the position of the parts and the motion therebetween.

Another object is to provide a new and improved ball and socket joint having a sealing ring placed in substantially a line contact with the ball and socket members of the joint and so arranged that any fluid tending to leak through the joint exerts a pressure on the seal ring which increases the pressure of the ring against the parts of the joint and effectively prevents leakage.

Another object is to provide a flexible joint comprising ball and socket members, one of which has in an intermediate peripheral zone of its bearing surface, a channel and an elastically deformable sealing ring of rubber or other suitable material having a substantially circular cross-section positioned in the channel and compressed slightly against the bottom of the channel and the spherical surface of the other member.

A further object is to provide a new and improved ball and socket joint which is light in weight and small in size for a given pipe size and which is readily adapted for use in connecting a relatively large number of links in a flexible conduit.

In pursuance of the foregoing and other objects, I aim to provide a flexible pipe joint having ball and socket members provided with communicating bores and spherical bearing surfaces which are mutually complementary and operatively engaged to afford a universally pivotal mechanical connection between the members, one of said members having an annular channel in its bearing surface and in a plane substantially transverse to the axis of its bore, and an elastically deformable sealing ring in the channel having inner and outer peripheral portions of curvilinear transverse section with which the bottom wall portion of the channel and the spherical bearing surface of the other member are in substantially line contact and so arranged that fluid finding access to said channel acts to deform said ring in a manner to increase the sealing contact thereof with said members.

In the drawings:

Fig. 1 is a longitudinal central section through a preferred form of the invention.

Fig. 2 is an enlarged fragmentary view in the same plane as Fig. 1.

Fig. 3 is an enlarged fragmentary view similar to Fig. 2 showing a modification.

Fig. 4 is a longitudinal central section through another form of the invention.

Fig. 5 is a longitudinal central section through a flexible conduit embodying the invention.

While I have shown in the drawings and shall herein describe in detail a preferred form of the invention, together with certain modifications thereof, it is to be understood that these are to be considered as exemplifications of the principles of the invention and are not intended to limit the invention to the particular forms shown. The scope of the invention will be pointed out in the appended claims.

As shown in Fig. 1, the invention is embodied in a flexible pipe joint which comprises a socket member 10 having a bore adapted at one end for connection to a conduit by means of a threaded portion 11 and formed adjacent its other end with a spherical bearing surface 12, 13. A ball member 14 has a communicating bore which is adapted at one end for connection to a conduit by means of a threaded portion 15, and has a spherical bearing surface 16 slidably engaging the socket surface 12, 13. Diametrically opposite slots or keyways 14' are provided to receive a suitable tool inserted through the bore 11 of the socket member to hold the ball member against rotation (or to rotate it) in connecting the ball member to a pipe. The bearing surfaces of the respective members are of limited axial extent and are mutually complementary and operatively engaged to afford a universally pivotal mechanical connection between them. The socket member is formed in two parts, 17 and 18, having annular portions telescopically mated and which are screw threaded together at 19. These parts have opposed surfaces 20 and 21 which cooperate to form side wall portions of an annular groove or channel 22 in the intermediate peripheral zone of the socket member, which channel is spanned by the spherical surface of the ball member. The parts have also opposed surfaces 23 and 24 which abut each other when the parts are assembled to form a joint therebetween along the right hand side wall portion of the channel 22 and to determine accurately the width of the channel. The surface 23 is formed on the end of an annular flange portion of the part 17 and which forms the bottom wall portion of the channel. This provides a bottom wall portion for the channel which is smooth and uninterrupted by joints across its entire surface.

In order to seal the joint between the ball and socket members, an elastically deformable sealing ring 25 of rubber, synthetic rubber, or other suitable material, is placed in the channel 22 and compressed slightly against the bottom wall portion of the channel at 26 and against the spherical surface of the ball at 27 and against one side wall portion of the channel at 21, leaving the other side of the ring spaced from the opposite side wall portion 29 of the channel, as shown more clearly in Fig. 2. The ring is preferably circular in cross-section so as to have inner and outer peripheral portions of curvilinear transverse section which form substantially a line contact with the ball member at 27 and with the socket member at 26, and a convex side wall portion spaced from the side wall portion 20 of the channel. Since the pressure required to maintain a seal on such line contacts is relatively small, the members of the joint are left freely movable relatively to each other.

Any fluid from the passageway 28 in the joint which has a tendency to leak moves in the direction of arrow 29, penetrating between the adjoining spherical surfaces of the members until it finds access to the channel 22. Any fluid entering the channel 22 is on the side of the ring 25 which is spaced from and free of contact with the side wall portion 20 of the channel with the result that substantially the entire convex side surface of the ring becomes subjected to the pressure of the fluid tending to leak. If this pressure becomes appreciable, such pressure acts to flatten the convex surface and to deform the elastic sealing ring 25 towards or into a position as shown in dotted lines in Fig. 2 and at the same time to increase the pressure of the ring against the spherical surface of the ball and against the side wall portion 21 and bottom wall portion of the channel, thus increasing the sealing pressure of the ring against the members. The contact of the sealing ring is against the bottom wall portion of the channel at 26 and along a line to the left of the joint formed between the abutting surfaces 23 and 24 of the two parts of the socket member. Thus the sealing ring always contacts a smooth and uninterrupted surface on the bottom portion of the channel and also serves to prevent leakage of fluid out through the joint between the parts of the socket member.

The ball and socket members and the sealing ring are so dimensioned that in assembling these parts, as shown in Figs. 1 and 2, the sealing ring is stretched slightly around the ball member to form a substantially line sealing contact therewith and is compressed slightly against the bottom wall portion of the channel 22 at 26. This partial compression of the sealing ring during assembly is not great enough to expand the ring laterally into contact with both of the opposed side wall portions of the channel. Considering the side wall portion 20 as the "inside" wall of the channel because it is nearest the fluid passage 28 along the path of flow of any pressure fluid, the sealing ring is spaced from this inside wall of the channel so as to leave substantially one-half of the convex side wall surface of the sealing ring exposed to pressure fluid. This arrangement permits of the use of a relatively narrow line contact of the sealing ring against the ball member when the parts are initially assembled, and provides for relatively free and easy movement of the members relatively to each other. Any fluid entering the channel in sufficient volume to increase the pressure on the sealing ring, acts to maintain the line contact of the ring against the ball and to widen the line of contact somewhat in proportion to the increase in pressure. At all times this leaves the members of the joint as free to move as is possible while still maintaining a leak-proof seal.

In the form illustrated in Fig. 3, a channel 30 of a different cross-sectional shape is formed in the socket member. This channel has converging angular wall portions 31 and 32 joined by a curved wall portion 33 forming the bottom of the channel. Here again the elastically deformable sealing ring 25 is compressed slightly against the ball member 14 at 27 and is also compressed slightly against the bottom wall portion 33 of the channel to form substantially line contacts. Furthermore, the sealing ring is positioned more against the side wall portion 32 of the channel so as to leave substantially the entire left hand side of the ring 25 exposed to pressure fluid entering the channel. Although the form of the channel for the sealing ring may vary substantially and may be in the socket member, as shown in Figs. 1 to 3, or in the ball member, as shown in Fig. 4, it is preferable to form the channel and to locate the sealing ring therein in such a manner that about seven-sixteenths of the entire surface of the sealing ring is left exposed to the fluid entering the channel. This insures sufficient area being subject to the pressure fluid to insure proper deformation of the sealing ring to maintain a leak-proof seal between the ball and socket members.

In the form shown in Fig. 4, a socket member 40 is formed in a single piece. It has a bore therethrough with a threaded portion 41 at one end, and has a spherical bearing surface 42 adjacent the other end. A ball member 43 has a bore with a threaded portion 44 for a conduit and has a spherical bearing surface 45 slidably engaging the socket surface 42. Keyways 43" are provided in the ball member to receive a suitable tool. In this form of the invention, an annular groove or channel 43' is formed in the ball member and an elastically deformable sealing ring 25 is positioned in said channel so as to have contact with the ball and socket members in the same manner as disclosed in Fig. 2. Here, again, the bottom wall portion of the channel is a smooth and uninterrupted cylindrical surface which insures uniform sealing contact with the sealing ring.

In assembling a joint of the form illustrated in Fig. 4, the socket member is initially constructed with its socket-forming portion 46 having a cylindrical portion 47 as indicated in dotted lines so that the ball member 43 with a sealing ring 25 thereon can be inserted from the left to position the spherical surface of the ball against that of the socket member. After the parts have been so assembled, the portion 47 of the socket member is spun or otherwise deformed into the curved position shown in full lines. Here again the two members of the joint are freely movable with respect to each other so that the joint can be readily flexed. In order that the sealing contact of the ring 25 with the ball and socket members can be readily controlled, the channel 43' is positioned in the ball member at, or to the left, of a vertical line passing through the center 48 of the spherical bearing surfaces of the ball and socket members. Thus the diameter of the portion 46 of the socket member which engages the sealing ring 25 at 49 is not altered during the spinning or deforming operation, all of the deformation of the socket member taking place to the right of the point 49, as shown in Fig. 4.

In the forms of the invention illustrated in Figs. 1 to 3 and 5 the sealing line contact of the sealing ring with the ball and socket members is also to the left of a plane through the center of the ball and perpendicular to the axis of the bore therethrough. In Figs. 1 and 2 the side wall portion 21 of the channel is about in such a transverse plane, so that even though the bottom wall portion of the channel is cylindrical, the channel is shallower towards the low pressure or right hand side wall portion 21. The pressure of pressure fluid therefor acts to deform the sealing ring into a portion of the channel having a reduced cross section. Furthermore, as the ring is deformed from the full line position in Fig. 2 to the dotted line position, the ring is forced over a surface of larger diameter. This causes a stretching of the ring to increase the sealing pressure of the ring against the ball.

By providing a ball and socket joint with an elastically deformable sealing ring which has substantially a line contact with the spherical surface which it engages, the invention provides a joint which is extremely flexible and easy to operate whether the fluid passing therethrough is under pressure or not. The initial line contact need be only sufficient to prevent leakage of fluid under no pressure or under very light pressures, since the sealing means as a whole is adapted to increase the pressure on the sealing surface as the pressure of pressure fluid in the channel increases. Thus, at all times the members of the joint may have the greatest flexibility consistent with the pressure of the fluid passing therethrough. This characteristic of the invention makes it possible to form a flexible conduit of considerable length by the use of a relatively large number of joints, as illustrated in Fig. 5. Although attempts have been made in the past to form flexible conduits by linking a plurality of conduit sections together by means of ball and socket joints, the friction in each joint has been so great as to prevent the conduit from being truly flexible. With applicant's joint, such a conduit remains flexible regardless of whether fluid is flowing therethrough or not, and regardless of the pressure of the fluid.

In manufacturing joints embodying the invention, it is possible to construct the ball and socket members with sufficient clearance between their spherical surfaces so that the members are freely movable relatively to each other, and still obtain effective sealing against fluid leakage. Joints for small sized pipes (on the order of 1") have been made with ten to fifteen thousandths inch radial clearance therebetween for operation on fluids under pressures from zero to five hundred pounds per square inch or more, without leakage, due to the effective sealing means, and such joints have been freely flexible when conducting high pressure fluid as well as when conducting fluid under low or no pressure.

As indicated by the various forms disclosed, the groove or channel for the sealing ring may be placed in either the ball or the socket member, the term ball being used to designate a member having a peripheral portion with a spherical surface adapted to engage the spherical surface of the socket even though the ends of the member may be flat or of other non-spherical shape.

I claim:

1. A flexible pipe joint freely movable under pressure, said joint comprising ball and socket members respectively provided with communicating bores and spherical bearing surfaces of limited axial extent, the bearing surfaces of the respective members being mutually complementary and operatively engaged to afford a universally pivotal mechanical connection between said members, one of said members having at an intermediate peripheral zone of its bearing surface a channel having side and bottom wall portions and spanned by the bearing surface of the other member, and an elastically deformable sealing ring in the channel having inner and outer peripheral portions of curvilinear transverse section with which the bottom wall portion of the channel and the bearing surface of the other member are in line contact, said channel having greater axial extent than said ring whereby the ring contacts only one side wall portion and is free of the other side wall portion thereof whereby to expose the free side of the ring, and said channel having its bottom wall approaching the said other member more closely at one side of the channel than at the other, whereby said ring is deformable toward said one side wall portion of the channel and in increased width of line contact with the respective members under pressure penetrating between said surfaces from said bores and finding access to said ring between the ring and said other side wall portion of the channel.

2. A flexible joint as defined in claim 1, in which the socket member comprises first and second parts having annular portions telescopically mated, the interior such portion comprising an annular flange spaced from the ball and constituting the bottom of the channel and marginally abutting said other portion, whereby to provide a smooth bottom for the channel continuous to the corner thereof.

3. A flexible pipe joint comprising a ball member provided with an axial bore and a spherical bearing surface, a socket member provided with an axial bore, said socket member having an annular spherical bearing surface at both sides of a diametrical plane normal to its axis and in which the bearing surface of said ball is engaged in universally pivotal mechanical bearing connection, one of said members being provided with a channel in an intermediate zone of its bearing surface and having side and bottom wall portions and spanned by the bearing surface of the other member, the side wall portions of the channel being approximately parallel, and an elastically deformable sealing ring of curvilinear inner and outer peripheral outline in cross section and in approximately line contact with said bottom wall portion and one side portion of the channel and the bearing surface of said other ring and free of the other wall portion of the channel, the bottom wall portion of the channel being substantially cylindrical and continuous and unbroken axially of the ring and the form of the channel in cross section deviating from rectangular to the extent that the spherical bearing surface is not parallel to the said cylindrical channel bottom wall portion and being of greater axial than radial dimensions whereby to accommodate deformation of the ring under pressure.

4. A flexible joint as defined in claim 3, in which the socket comprises a single one piece bearing surface, and the channel is located in the ball member.

5. A flexible joint as defined in claim 3, in which the socket member comprises two screw threaded parts each providing a portion of the bearing surface engaged about the ball, one of said parts being provided within such connection with an annular flange spaced from the ball to provide one side wall portion and the bottom wall portion of the channel, the other part providing the other side wall portion of the channel in abutment with said flange.

6. The device of claim 3 in which the socket member comprises two parts each providing a portion of the bearing surface engaged about the ball, one of said parts being provided within such connection with an annular flange spaced from the ball to provide one side wall and the bottom wall portion of the channel, the other element providing the other side wall portion of the channel in abutment with said flange, said other side wall portion being nearer than said one side wall portion to said diametrical plane.

7. A ball and socket joint for fluid conduits comprising a socket member adapted at one end for attachment to a conduit and formed with a spherical surface at the other, a ball member adapted at one end for attachment to a conduit and formed with a spherical surface freely slidable on said spherical surface of the socket member, one of said members having an annular channel in its spherical surface extending in substantially a transverse plane when the members are in position for attachment to alined conduits, and means for sealing the spherical surfaces of said members against leakage and permitting substantially free movement of one with respect to the other comprising an elastically deformable sealing ring positioned in said channel and compressed against the bottom wall of the channel and the spherical surface of the other member, so as to have substantially a line contact with said spherical surface, and having a convex side wall constituting substantially seven-sixteenths or more of the entire side wall area of the ring and spaced from the inside side wall of the channel so that fluid passing along the spherical surfaces to said channel exerts a pressure on sufficient area of the convex surface of the ring to flatten said surface and expand the ring into firmer sealing engagement with the spherical surface it engages, the bottom wall of the channel and the tangent of said spherical surface at the point of contact of the other member being mutually convergent in the direction in which the ring is urged under said pressure.

8. A ball and socket joint comprising a socket member adapted at one end for attachment to a conduit and formed with a spherical surface, a ball member adapted at one end for attachment to a conduit and formed with a spherical surface fitting slidably on said spherical surface of the socket member, said socket member having an annular channel extending in a plane substantially transverse to the line of flow of a fluid therethrough and being formed in two parts which have opposed surfaces forming the side walls of the channel and additional opposed surfaces which abut each other adjacent the edge of the channel farthest from the conduit attaching end of the socket member when the parts are fastened together and which determine accurately the width of the channel, and means for sealing said members against leakage comprising an elastically deformable ring in said channel having a normal cross-section with curvilinear surfaces positioned against one side wall only thereof and compressed against the bottom wall of the channel and the spherical surface of the ball member to seal the joint between the spherical surfaces with substantially line contact and also to seal the joint between the abutting surfaces of the two parts of the socket member, the channel being wholly at one side of the transverse diameter of the spherical surface of the ball member and having its said bottom wall convergent toward the spherical surface of the ball member in a direction toward the said diameter.

9. A ball and socket joint comprising a socket member formed in a single piece having a coupling for attachment to a conduit and formed with a spherical surface at the other end, a ball member having a coupling for attachment to a conduit and formed with a spherical surface fitting slidably on said spherical surface of the socket member, one of said members having an annular channel in its spherical surface extending in substantially a transverse plane when the members are in position for attachment to alined conduits, and means for sealing the spherical surfaces of said members against leakage comprising an elastically deformable ring having substantially circular normal cross-section positioned in said channel and against one side wall portion only thereof and compressed slightly against the bottom wall portion of the channel and the spherical surface of the other member, the said channel side wall portion being substantially in the plane of the transverse diameter of the spherical surface of the member having the channel, and the rest of the channel being offset from said diameter away from the coupling end of such member.

CHARLES F. WARREN.

REFERENCES CITED

The following references are of record in the file of this patent:

UNITED STATES PATENTS

| Number | Name | Date |
| --- | --- | --- |
| 153,511 | Yocum | July 28, 1874 |
| 848,169 | Hawley | Mar. 26, 1907 |
| 922,075 | Bates | May 18, 1909 |
| 1,342,131 | Mycock | June 1, 1920 |
| 2,377,674 | Chisholm | June 5, 1945 |
| 2,412,664 | Wolfram | Dec. 17, 1946 |

FOREIGN PATENTS

| Number | Country | Date |
| --- | --- | --- |
| 53,836 | Switzerland | Nov. 12, 1910 |
| 440,040 | France | of 1912 |
| 192,288 | Great Britain | Feb. 1, 1923 |